United States Patent
Liang et al.

(10) Patent No.: US 7,110,252 B2
(45) Date of Patent: Sep. 19, 2006

(54) DOCKING STATION WITH A RELEASING UNIT

(75) Inventors: Hui-Yin Liang, Taipei Hsien (TW); Lung-Chang Lu, Taipei Hsien (TW); Kai-Chen Tien, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 198 days.

(21) Appl. No.: 10/857,494

(22) Filed: Jun. 1, 2004

(65) Prior Publication Data

US 2005/0128687 A1 Jun. 16, 2005

(30) Foreign Application Priority Data

Dec. 10, 2003 (TW) .............................. 92221690 U (51) Int. Cl.
*H01H 5/00* (2006.01)
*G06F 13/10* (2006.01)

(52) U.S. Cl. ...................................... 361/686; 361/683

(58) Field of Classification Search ................ 361/679, 361/686, 683, 732, 733; 710/303
See application file for complete search history.

(56) References Cited

U.S. PATENT DOCUMENTS

| 5,283,714 | A | * | 2/1994 | Tsai et al. .................... 361/683 |
| 5,450,271 | A | * | 9/1995 | Fukushima et al. ......... 361/686 |
| 5,452,180 | A | * | 9/1995 | Register et al. ............. 361/686 |
| 5,557,562 | A | * | 9/1996 | Yoshiharu et al. .......... 361/686 |
| 5,768,101 | A | * | 6/1998 | Cheng ......................... 361/687 |
| 5,966,285 | A | * | 10/1999 | Sellers ....................... 361/686 |
| 6,362,959 | B1 | * | 3/2002 | Tracy ......................... 361/687 |
| 6,744,627 | B1 | * | 6/2004 | Won et al. .................. 361/686 |

FOREIGN PATENT DOCUMENTS

JP 07056662 A * 3/1995

* cited by examiner

*Primary Examiner*—Anatoly Vortman
(74) *Attorney, Agent, or Firm*—Berenato, White & Stavish LLC (57) ABSTRACT

A docking station includes a housing, an interlocking member, and a releasing unit mounted on the housing. The releasing unit includes a driving member movable relative to the housing in a driving direction for moving the interlocking member from a locking position to an unlocking position, an operating lever pivoted to the housing so as to be rotatable relative to the housing, and a transmission linkage interconnecting the driving member and the operating member in such a manner that rotation of the operating lever in a rotating direction results in movement of the driving member in the driving direction through the transmission linkage.

15 Claims, 8 Drawing Sheets

DOCKING STATION WITH A RELEASING UNIT

CROSS-REFERENCE TO RELATED APPLICATION

This application claims priority of Taiwanese Application No. 092221690, filed on Dec. 10, 2003.

BACKGROUND OF THE INVENTION

1. Field of the Invention

This invention relates to a docking station, more particularly to a docking station with a releasing unit for disengaging the docking station from an electronic device, such as a notebook computer.

2. Description of the Related Art

Conventional docking stations normally include a releasing unit for disengaging the docking station from a portable electronic device, such as a notebook computer. The aforesaid releasing unit includes a plurality of linkages for transmission of an external force to an interlocking member, such as a latch, which results in movement of the interlocking member from a locking position to an unlocking position relative to the electronic device.

The conventional releasing unit is disadvantageous in that a relatively large number of the linkages are utilized, which complicates the structure of the docking station and which requires high precision in manufacturing the same in order to avoid cumulative error in movements of the linkages. In addition, the docking station normally includes an operating lever, which serves to operate the linkages, protruding outwardly from a side wall of the docking station, which has an adverse effect on the appearance of the docking station.

SUMMARY OF THE INVENTION

Therefore, it is an object of the present invention to provide a docking station with a releasing unit that is capable of overcoming the aforementioned drawbacks of the prior art.

According to this invention, there is provided a docking station that is adapted to be connected to an electronic device. The docking station comprises: a housing; at least a first interlocking member mounted on and movable relative to the housing between a locking position, in which the first interlocking member is adapted to engage releasably a second interlocking member of the electronic device, and an unlocking position, in which the first interlocking member is adapted to disengage from the second interlocking member; and a releasing unit mounted on the housing. The releasing unit includes: a driving member movable relative to the housing in a driving direction for driving the first interlocking member to move from the locking position to the unlocking position; an operating lever spaced apart from the driving member and pivoted to the housing so as to be rotatable relative to the housing; and a transmission linkage extending between the driving member and the operating member in a transverse direction relative to the driving direction and having one end connected to the driving member, and an opposite end that is opposite to said one end and that is pivoted to the operating lever so that rotation of the operating lever in a rotating direction results in movement of the driving member in the driving direction through the transmission linkage.

BRIEF DESCRIPTION OF THE DRAWINGS

In drawings which illustrate an embodiment of the invention.

DETAILED DESCRIPTION OF THE PREFERRED EMBODIMENT

Figure 1:
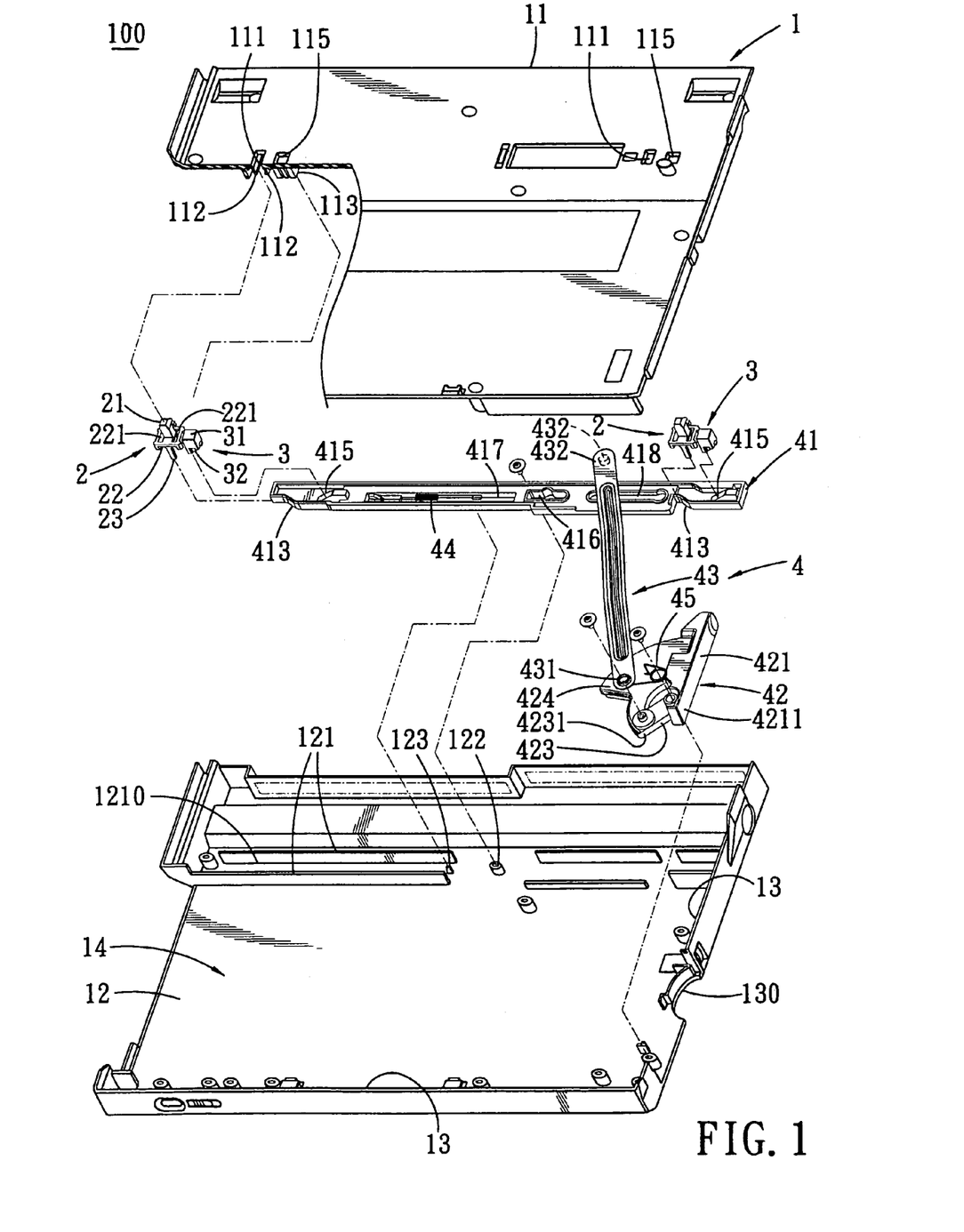
FIG. 1 is an exploded perspective view of the preferred embodiment of a docking station according to the present invention.
Figure 2:
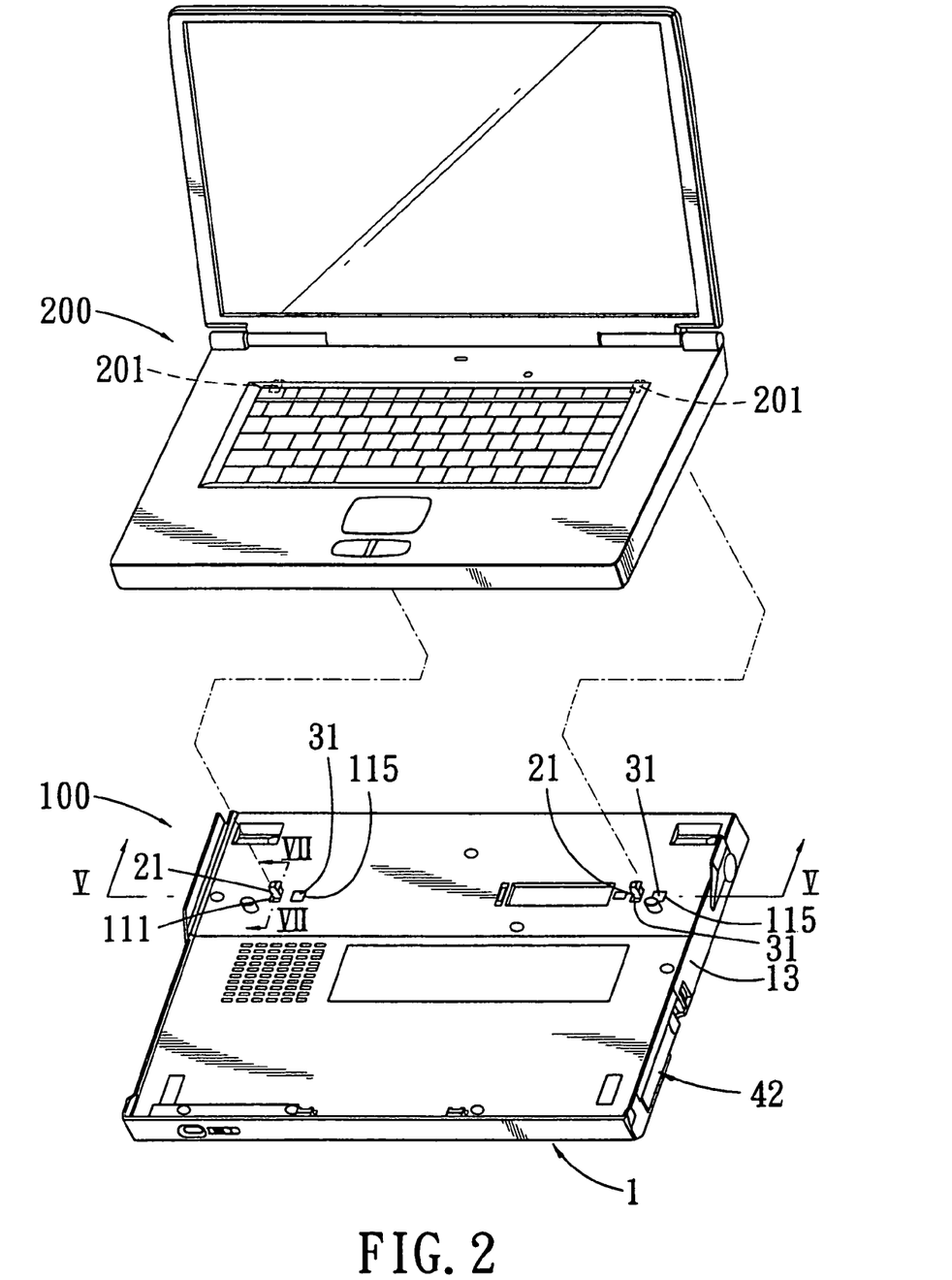
FIG. 2 is a perspective view of the docking station of FIG. 1, with a notebook computer to be disposed thereon.
Figure 3:
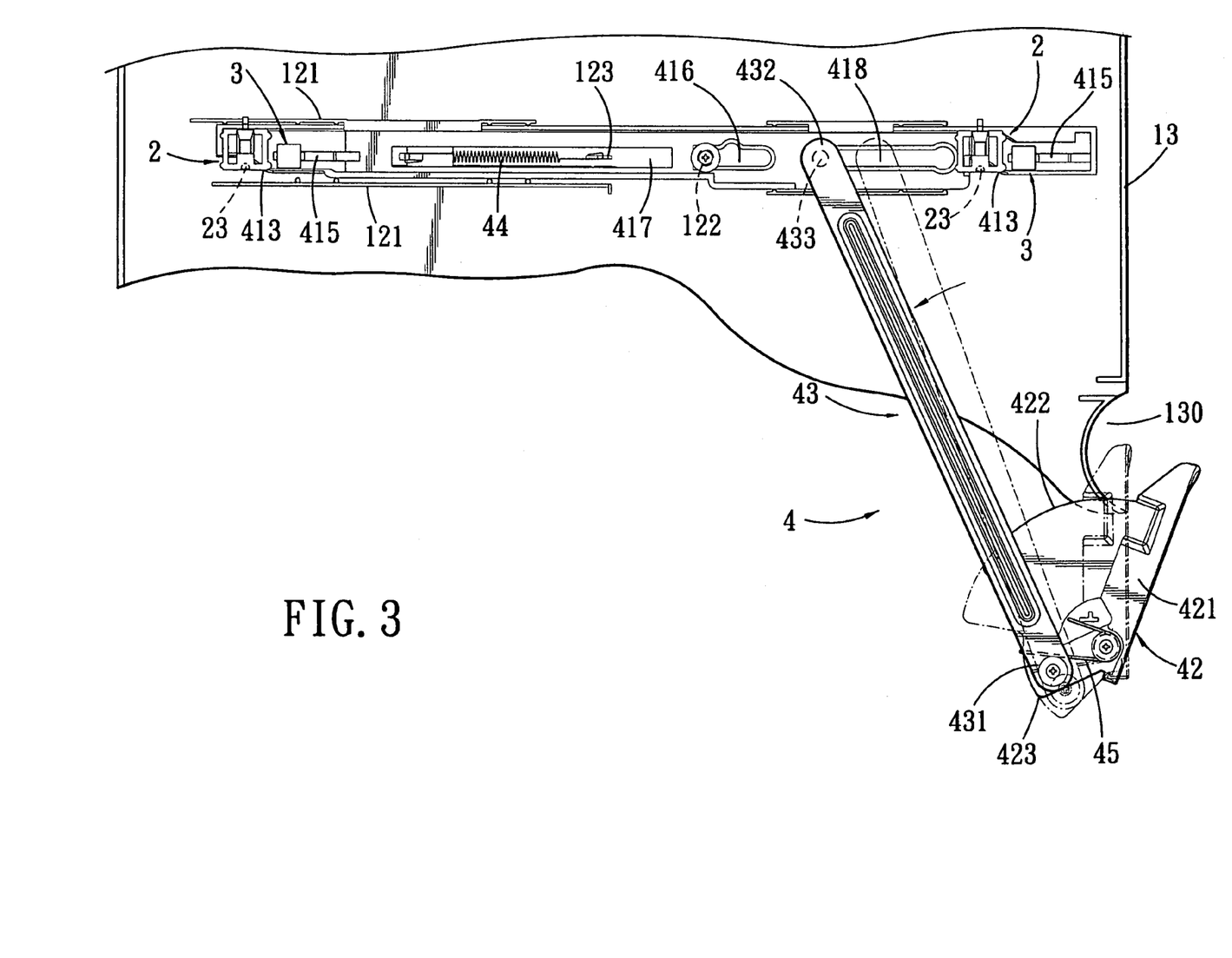
FIG. 3 is a fragmentary top view of the docking station of FIG. 1, with a driving member disposed at a normal position and an operating member moving from a normal position to a first angular position.

FIGS. 1 to 3 illustrate a preferred embodiment of a docking station 100 according to the present invention, which is adapted to be connected to a portable electronic device 200, such as a notebook personal computer.

The docking station 100 includes: a housing 1; two first interlocking members 2 mounted on and movable relative to the housing 1 between a locking position (see FIG. 7), in which the first interlocking members 2 are adapted to engage releasably and respectively two second interlocking members 202 (each of which is defined by a periphery of a hole 201 in the bottom wall of the electronic device 200) of the electronic device 200, and an unlocking position (see FIG. 8), in which the first interlocking members 2 are adapted to disengage from the second interlocking members 202; and a releasing unit 4 mounted on the housing 1.

The releasing unit 4 includes: a driving member 41 movable relative to the housing 1 in a first driving direction for driving the first interlocking members 2 to move from the locking position to the unlocking position; an operating lever 42 spaced apart from the driving member 41 and pivoted to the housing 1 so as to be rotatable relative to the housing 1; and a transmission linkage 43 extending between the driving member 41 and the operating member 42 in a transverse direction relative to the first driving direction and having one end 432 connected to the driving member 41, and an opposite end 431 that is opposite to said one end 432 and that is pivoted to the operating lever 42 so that rotation of the operating lever 42 in a first rotating direction results in movement of the driving member 41 in the first driving direction through the transmission linkage 43, which, in turn, results in movement of the first interlocking members 2 from the locking position to the unlocking position.

Figure 7:
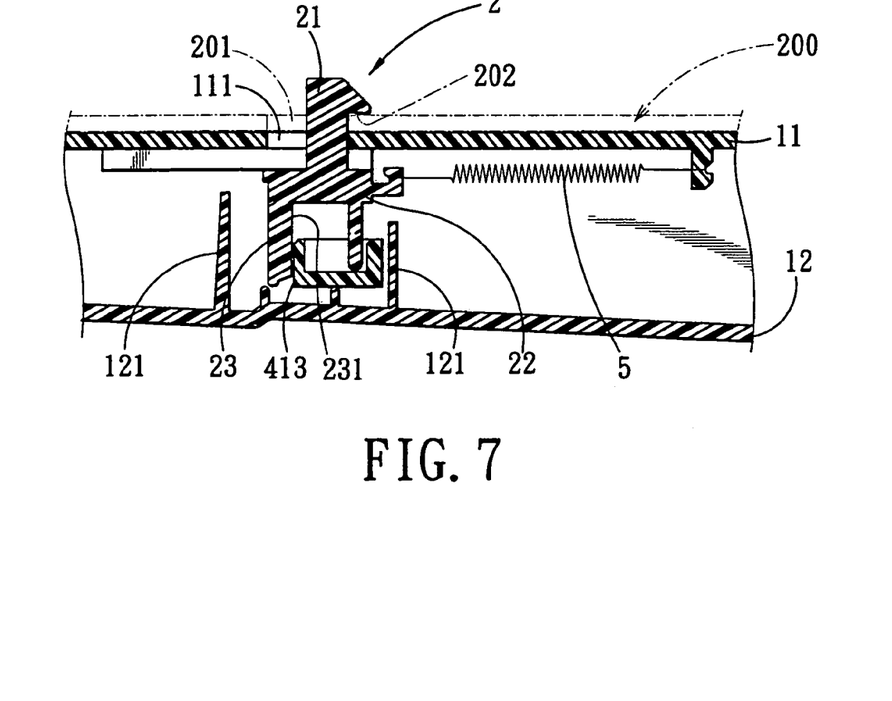
FIGS. 7 and 8 are sectional views to illustrate how a first interlocking member is moved from a locking position to an unlocking position.
Figure 8:
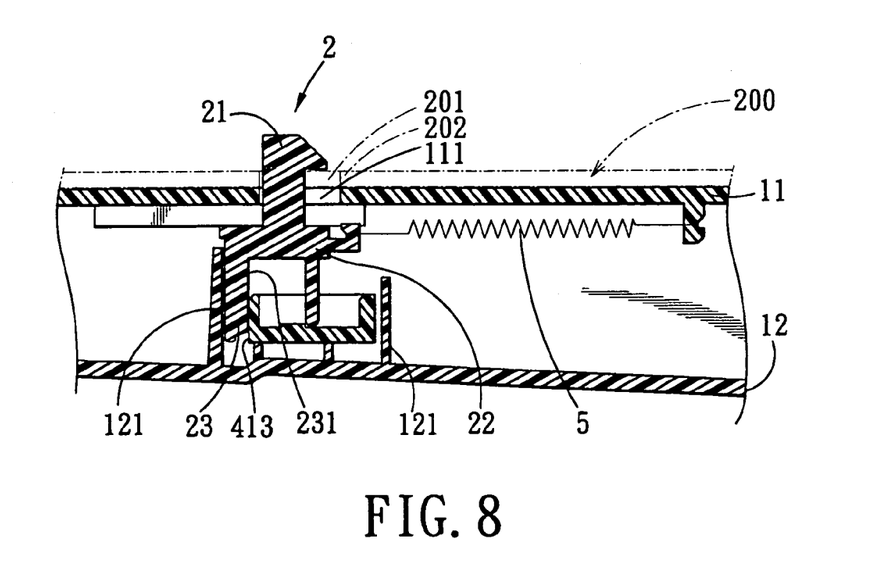

The docking station 100 further includes a first urging member 45 for urging the operating lever 42 to move in a second rotating direction opposite to the first rotating direction to its normal position (see FIG. 3), a second urging member 44 for urging the driving member 41 to move in a second driving direction opposite to the first driving direction to its normal position (see FIG. 3), and two third urging members 5 for urging the first interlocking members 2 to move from the unlocking position (see FIG. 8) to the locking position (see FIG. 7).

In this embodiment, the driving member 41 defines a pair of first unlocking cam faces 413 Each of the first interlocking members 2 defines a second unlocking cam face 231 (see FIG. 7) that is driven by a respective one of the first unlocking cam faces 413 upon movement of the driving member 41 in the first driving direction.

Figure 9:
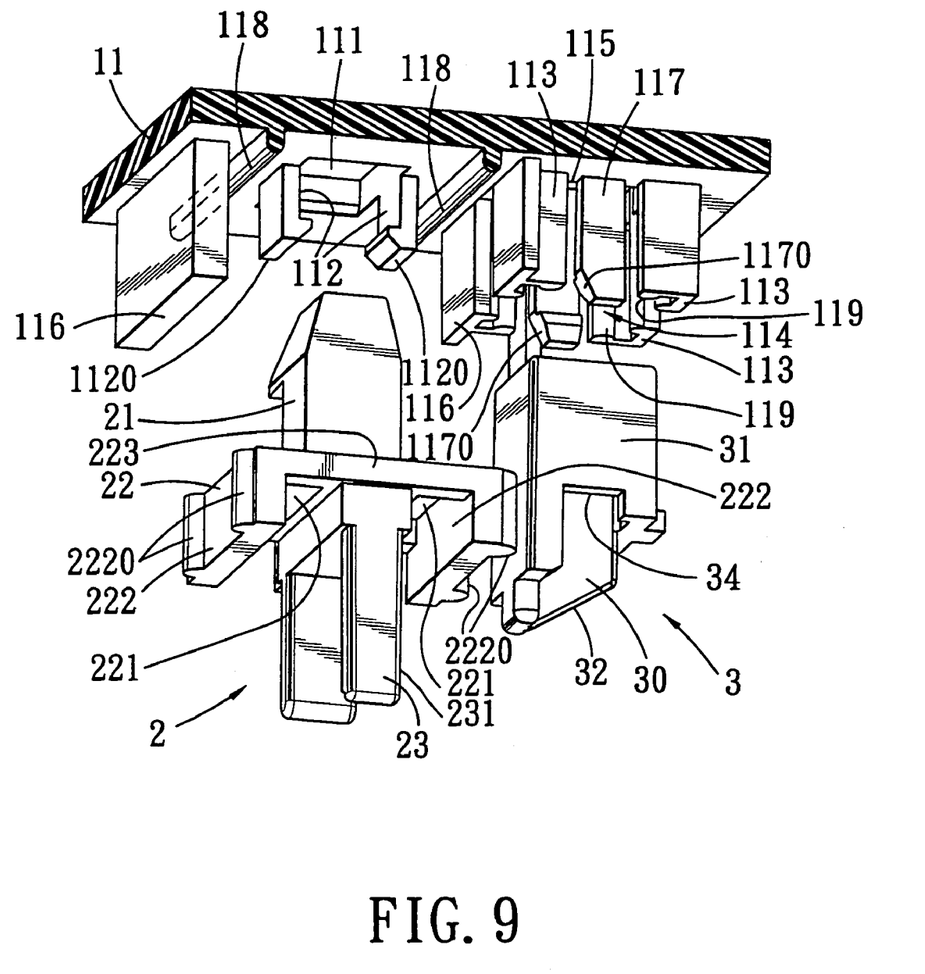
FIG. 9 is a fragmentary perspective, partly sectional view of the docking station of FIG. 1.

Referring to FIG. 9, in combination with FIG. 1, the housing 1 defines an inner space 14 therein, and has opposite top and bottom walls 11, 12. The driving member 41 is mounted slidably on the bottom wall 12 within the inner space 14. Each of the first interlocking members 2 includes a seat 22 that is mounted slidably on the top wall 11 of the housing 1 within the inner space 14, a hook part 21 that protrudes upwardly and outwardly of the housing 1 from the seat 22 through the top wall 11 of the housing 1 and that is adapted to engage the respective second interlocking member 202 of the electronic device 200, and a leg part 23 that protrudes downwardly from the seat 22 toward the driving member 41 and that defines the second unlocking cam face 231.

The top wall 11 of the housing 1 is formed with two opposite first through-holes 111 and two pairs of opposite supporting legs 112 (only one pair is shown in FIG. 9). The supporting legs 112 in each pair project downwardly from a periphery of a respective first through-hole 111 into the inner space 14 in the housing 1, and respectively have hook ends 1120. The seat 22 of each first interlocking member 2 has two opposite ends and a middle portion 223 between the opposite ends of the seat 22, and is formed with two opposite slots 221 divided by the middle portion 223. The middle portion 223 of the seat 22 has two opposite ends, each of which confines one side of a respective one of the slots 221. The hook part 21 projects upwardly from the middle portion 223 of the seat 22 through a respective first through-hole 111 in the top wall 11 of the housing 1 and into a respective hole 201 in the bottom wall of the electronic device 200 to engage the periphery 202 of the hole 201. Each pair of the supporting legs 112 project downwardly from the top wall 11 through the slots 221 in the seat 22 of the respective first interlocking member 2, respectively, so as to limit movement of the first interlocking member 2 within the length of the slots 221. The hook ends 1120 of the supporting legs 112 are respectively in sliding contact with and anchored at the ends of the middle portion 223 of the seat 22 so as to permit sliding movement of the first interlocking member 2 thereon.

The top wall 11 of the housing 1 is further formed with two pairs of opposite confining members 116 (only one pair is shown in FIG. 9) projecting downwardly therefrom into the inner space 14. Each pair of the confining members 116 are opposite to each other in a confining direction parallel to the first driving direction. Each of the opposite ends of the seat 22 is formed with a confining wall 222 that projects downwardly therefrom, that is aligned with and disposed between a respective one of the confining members 116 and a respective one of the supporting legs 112, and that is formed with at least a rounded protrusion 2220 protruding therefrom and in sliding contact with the respective one of the confining members 116, thereby preventing movement of the first interlocking members 2 in the confining direction.

The top wall 11 of the housing 1 is further formed with two pairs of opposite rounded ribs 118 protruding downwardly therefrom into the inner space 14. The rounded ribs 118 in each pair are disposed above and are in sliding contact with respective ends of the seat 22 of a respective one of the first interlocking members 2.

Figure 5:
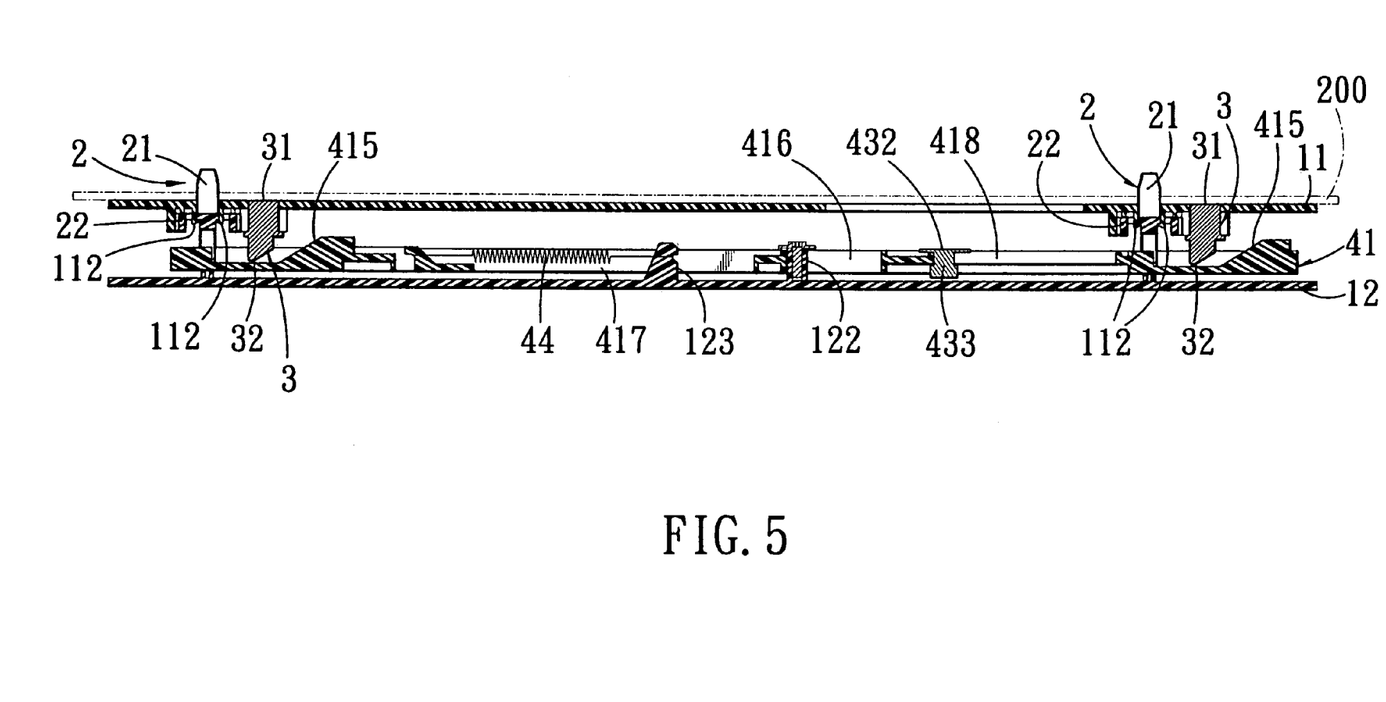
FIG. 5 is a sectional view taken along lines V—V in FIG. 2.
Figure 6:
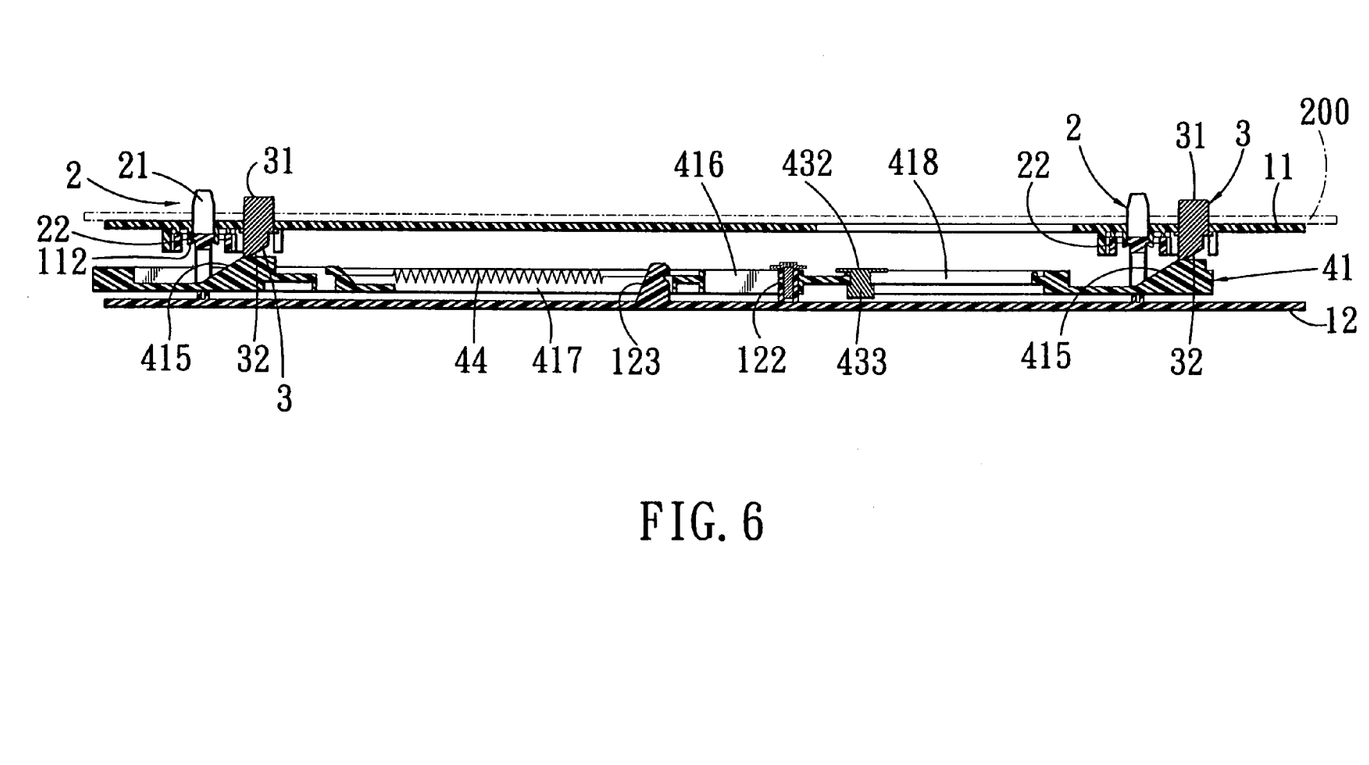
FIG. 6 is a sectional view to illustrate how a lifting member is moved from a non-lifting position shown in FIG. 5 to a lifting position.

The docking station 100 further includes two lifting members 3, each of which is mounted movably on the top wall 11 of the housing 1 and is driven by the driving member 41 to move relative to the housing 1 from a non-lifting position (see FIG. 5) to a lifting position (see FIG. 6), in which the electronic device 200 is lifted from the top wall 11 of the housing a through the lifting member 3, when the driving member 41 moves in the first driving direction.

The driving member 41 further defines a pair of first lifting cam faces 415. Each lifting member 3 defines a second lifting cam face 32 that is driven by a respective one of the first lifting cam faces 415 upon movement of the driving member 41 in the first driving direction.

The top wall 11 of the housing 1 is further formed with two opposite second through-holes 115 (see FIG. 1), a plurality of confining members 113 that are disposed around each second through-hole 115, that project downwardly from a periphery of the respective through-hole 115 into the inner space 14, and that cooperatively define a guiding channel 114 thereamong, and two pairs of opposite resilient supporting studs 117, each of which is disposed between two adjacent ones of the confining members 113, projects downwardly from the periphery of a respective second through-hole 115, and has a hook end 1170. Each lifting member 3 has a block body 31 that is formed with two opposite retaining grooves 34, that is received movably in the guiding channel 114 defined by corresponding ones of the confining members 113, and that is resiliently and slidingly clamped by a respective pair of the supporting studs 117, and a cam part 30 that projects downwardly from the block body 31 toward the driving member 41 and that defines the second lifting cam face 32. The hook ends 1170 of each pair of the supporting studs 117 project respectively into the retaining grooves 34 in the block body 31 so as to prevent undesired removal of the lifting member 3 from the housing 1. The block body 31 protrudes outwardly of the housing 1 through the respective second through-hole 115 to lift the electronic device 200 from the top wall 11 of the housing 1 when the lifting member 3 is disposed at the lifting position.

Preferably, each of the confining members 113 has an L-shaped cross-section, and is formed with a pair of rounded end protrusions 119 that are in sliding contact with the block body 31 of the corresponding lifting member 3.

The bottom wall 12 of the housing 1 is formed with two opposite guiding studs 121 that are opposite to each other in the transverse direction, that project upwardly therefrom into the inner space 14, and that cooperatively define a guiding space 1210 therebetween. The driving member 41 is mounted slidably on the bottom wall 12 of the housing 1 within the guiding space 1210, and is limited to move in the transverse direction by the guiding studs 121.

The driving member 41 is formed with an elongated limiting slot 416 that extends in the first driving direction. The bottom wall 12 of the housing 1 is further formed with a stopper 122 that projects upwardly therefrom through the limiting slot 416 and into the inner space 14 so as to limit movement of the driving member 41 within the length of the limiting slot 416.

The driving member 41 is formed with an elongated receiving slot 417 that extends in the first driving direction. The bottom wall 12 of the housing 1 is further formed with a spring-holding stud 123 that projects upwardly therefrom through the receiving slot 417. The second urging member 44 is received in the receiving slot 417, and is connected to the spring-holding stud 123 and the driving member 41.

The driving member 41 is further formed with an elongated slot 418 that extends in the first driving direction and that has two opposite ends. Said one end 432 of the transmission linkage 43 is formed with a driving stud 433 that projects downwardly therefrom into the slot 418 and that is disposed at a position between the ends of the slot 418 in such a manner that rotation of the operating member 42 in the first rotating direction to an angular position (see FIG. 3) results in movement of the driving stud 433 to said one end of the slot 418 and that further rotation of the operating lever 42 from the angular position in the first rotating direction results in movement of the driving member 41 in the first driving direction, which, in turn, results in movement of the first interlocking members 2 from the locking position toward the unlocking position (see FIG. 4).

Figure 4:
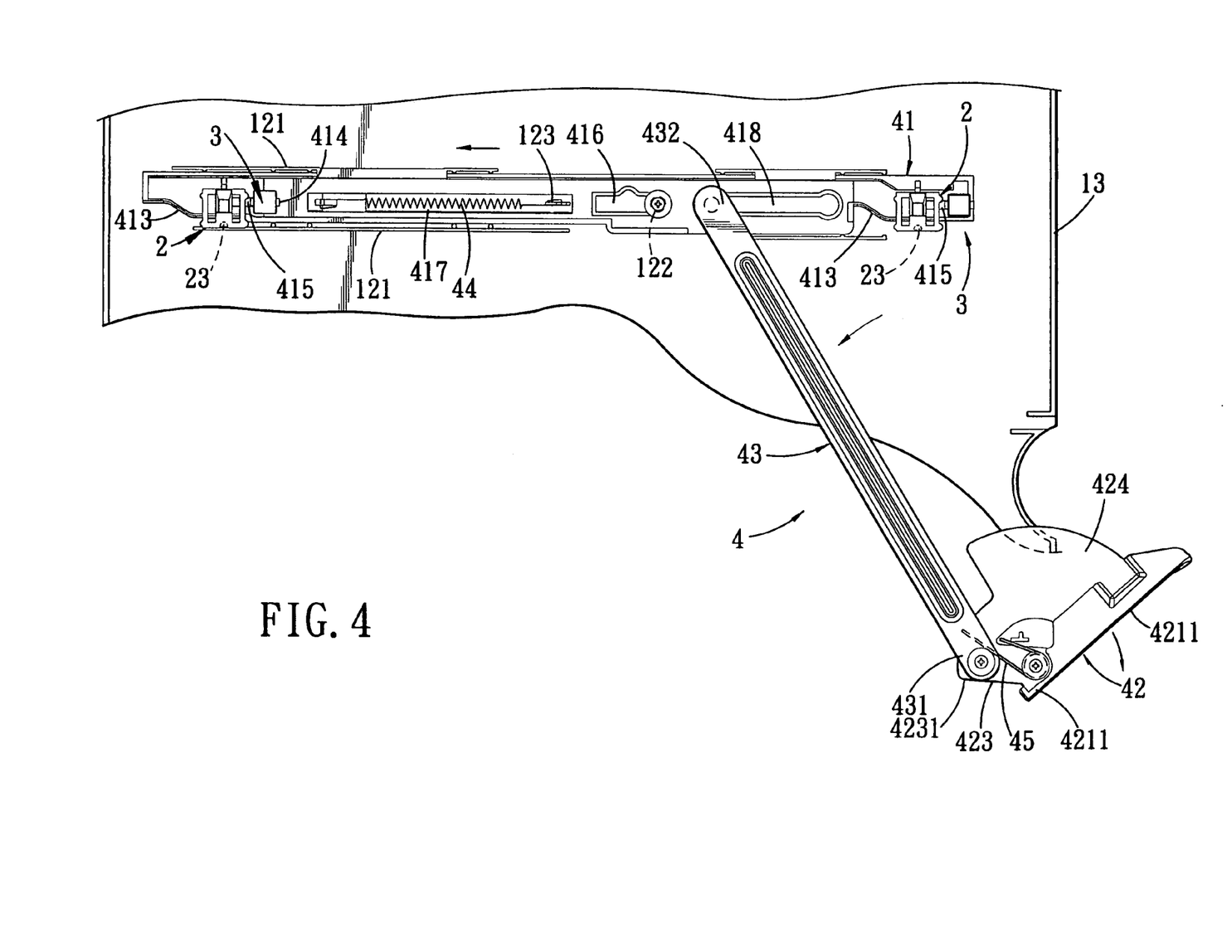
FIG. 4 is fragmentary top view of the docking station of FIG. 1, with the driving member disposed at a driving position and the operating member disposed at a second angular position.

The housing 1 has a side wall 13 that extends in the transverse direction and that is indented to form a recess 130 which extends in the transverse direction. The operating lever 42 has a first segment 421 that is received in the recess 130 when the operating lever 42 is disposed at its normal position, a second segment 423 that is received in the inner space 14 and that extends from and that cooperates with the first segment 421 to form an obtuse angle therebetween, and a sector segment 424 interconnecting the first and second segments 421, 423. Referring to FIG. 4, the first segment 421 has one end 4211 adjacent to the second segment 423 and pivoted to the bottom wall 12 of the housing 1. The second segment 423 has one end 4231 distal from the first segment 421. The opposite end 431 of the transmission linkage 43 is pivoted to the end 4231 of the second segment 423.

By virtue of the releasing unit 4, the aforesaid drawbacks associated with the prior art can be eliminated, and lifting of the electronic device 200 from the top wall 11 of the housing 1 of the docking station 100 for removal of the electronic device 200 therefrom can be facilitated.

With the invention thus explained, it is apparent that various modifications and variations can be made without departing from the spirit of the present invention.

We claim:

1. A docking station adapted to be connected releasably to an electronic device, comprising:
    a housing;
    at least a first interlocking member mounted on and movable relative to said housing between a locking position, in which said first interlocking member is adapted to engage releasably a second interlocking member of the electronic device, and an unlocking position, in which said first interlocking member is adapted to disengage from the second interlocking member; and
    a releasing unit mounted on said housing and including
        a driving member movable relative to said housing in a first driving direction for driving said first interlocking member to move from said locking position to said unlocking position,
        an operating lever spaced apart from said driving member and pivoted to said housing so as to be rotatable relative to said housing, and
        a transmission linkage extending between said driving member and said operating lever in a transverse direction relative to said first driving direction and having one end connected to said driving member, and an opposite end that is opposite to said one end and that is pivoted to said operating lever so that rotation of said operating lever in a first rotating direction results in movement of said driving member in said first driving direction through said transmission linkage;
    wherein said driving member defines a first unlocking cam face, said first interlocking member defining a second unlocking cam face that is driven by said first unlocking cam face upon movement of said driving member in said first driving direction,
    wherein said housing defines an inner space therein and has opposite top and bottom walls, said driving member being mounted slidably on said bottom wall within said inner space, said first interlocking member including a seat that is mounted slidably on said top wall within said inner space, a hook part that protrudes upwardly and outwardly of said housing from said seat through said top wall and that is adapted to engage the second interlocking member of the electronic device, and a leg part that protrudes downwardly from said seat toward said driving member and that defines said second unlocking cam face; and
    wherein said top wall is formed with a through-hole and two opposite supporting legs that project downwardly from a periphery of said through-hole into said inner space in said housing and that respectively have hook ends, said seat of said first interlocking member having two opposite ends and a middle portion between said opposite ends of said seat, and being formed with two opposite slots divided by said middle portion, said middle portion having two opposite ends, each of which confines one side of a respective one of said slots, said hook part projecting upwardly from said middle portion through said through-hole in said top wall, said supporting legs projecting downwardly from said top wall through said slots, respectively, so as to limit movement of said first interlocking member within the length of said slots, said hook ends of said supporting legs being respectively in sliding contact with and anchored at said ends of said middle portion so as to permit sliding movement of said first interlocking member thereon.

2. The docking station of claim 1, further comprising a first urging member for urging said operating lever to move in a second rotating direction opposite to said first rotating direction.

3. The docking station of claim 2, further comprising a second urging member for urging said driving member to move in a second driving direction opposite to said first driving direction.

4. The docking station of claim 3, further comprising a third urging member for urging said first interlocking member to move from said unlocking position to said locking position.

5. The docking station of claim 1, wherein said top wall is further formed with two opposite confining members projecting downwardly therefrom into said inner space, each of said opposite ends of said seat being formed with a confining wall that projects downwardly therefrom, that is aligned with and disposed between a respective one of said confining members and a respective one of said supporting legs, and that is formed with at least a rounded protrusion protruding therefrom and in sliding contact with the respective one of said confining members.

6. The docking station of claim 5, wherein said top wall is further formed with two opposite rounded ribs protruding downwardly therefrom into said inner space, each of said rounded ribs being disposed above and in sliding contact with a respective one of said ends of said seat.

7. The docking station of claim 1, further comprising at least a lifting member that is mounted movably on said top wall of said housing and that is driven by said driving member to move relative to said housing from a non-lifting position to a lifting position, in which the electronic device is lifted from said top wall of said housing through said lifting member, when said driving member moves in said first driving direction.

8. The docking station of claim 7, wherein said driving member further defines a first lifting cam face, said lifting member defining a second lifting cam face that is driven by said first lifting cam face upon movement of said driving member in said first driving direction.

9. The docking station of claim 8, wherein said top wall is formed with a through-hole, a plurality of confining members that are disposed around said through-hole, that project downwardly from a periphery of said through-hole into said inner space, and that cooperatively define a guiding channel thereamong, and two opposite resilient supporting studs, each of which is disposed between two adjacent ones of said confining members, projects downwardly from said periphery of said through-hole, and has a hook end, said lifting member having a block body that is received movably in said guiding channel and that is resiliently and slidingly clamped by said supporting studs, and a cam part that projects downwardly from said block body toward said driving member and that defines said second lifting cam face, said block body protruding outwardly of said housing through said through-hole to lift the electronic device from said top wall of said housing when said lifting member is disposed at said lifting position.

10. The docking station of claim 9, wherein each of said confining members has an L-shaped cross-section, and is formed with a pair of rounded end protrusions that are in sliding contact with said block body.

11. The docking station of claim 1, wherein said bottom wall of said housing is formed with two opposite guiding studs that project upwardly therefrom into said inner space and that cooperatively define a guiding space therebetween, said driving member being slidable within said guiding space and being limited to move in said transverse direction by said guiding studs.

12. The docking station of claim 11, wherein said driving member is formed with an elongated limiting slot that extends in said first driving direction, said bottom wall being further formed with a stopper that projects upwardly therefrom through said limiting slot and into said inner space so as to limit movement of said driving member within the length of said limiting slot.

13. The docking station of claim 11, wherein said driving member is formed with an elongated receiving slot that extends in said first driving direction, said bottom wall being further formed with a spring-holding stud that projects upwardly therefrom through said receiving slot, said docking station further comprising an urging member that is received in said receiving slot and that is connected to said spring-holding stud and said driving member so as to urge said driving member to move in a second driving direction opposite to said first driving direction.

14. The docking station of claim 11, wherein said driving member is formed with an elongated slot that extends in said first driving direction and that has two opposite ends, said one end of said transmission linkage being formed with a driving stud that projects downwardly therefrom into said slot and that is disposed at a position between said ends of said slot in such a manner that rotation of said operating lever in said first rotating direction to an angular position results in movement of said driving stud to said one end of said slot and that further rotation of said operating lever from said angular position in said first rotating direction results in movement of said driving member in said first driving direction, which, in turn, results in movement of said first interlocking member from said locking position toward said unlocking position.

15. The docking station of claim 14, wherein said housing has a side wall that extends in said transverse direction and that is indented to form a recess which extends in said transverse direction, said operating lever having a first segment that is received in said recess when said operating lever is disposed at a normal position, and a second segment that is received in said inner space and that extends from and that cooperates with said first segment to form an obtuse angle therebetween, said first segment having one end adjacent to said second segment and pivoted to said bottom wall of said housing, said second segment having one end distal from said first segment, said opposite end of said transmission linkage being pivoted to said end of said second segment.

* * * * *